US012663537B2

(12) United States Patent
Lin

(10) Patent No.: US 12,663,537 B2
(45) Date of Patent: Jun. 23, 2026

(54) METHOD AND APPARATUS FOR DETECTING STATIC OBJECT BY MEANS OF RADAR SENSOR OF ROADSIDE UNIT

(71) Applicant: Robert Bosch GmbH, Stuttgart (DE)

(72) Inventor: Shaodong Lin, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 18/337,760

(22) Filed: Jun. 20, 2023

(65) Prior Publication Data

US 2023/0408686 A1 Dec. 21, 2023

(30) Foreign Application Priority Data

Jun. 21, 2022 (CN) ......................... 202210703212.0

(51) Int. Cl.
| | |
|---|---|
| *G01S 13/931* | (2020.01) |
| *G01S 7/41* | (2006.01) |
| *G01S 13/89* | (2006.01) |

(52) U.S. Cl.
CPC ............ *G01S 13/931* (2013.01); *G01S 7/412* (2013.01); *G01S 13/89* (2013.01)

(58) Field of Classification Search
None
See application file for complete search history.

(56) References Cited

U.S. PATENT DOCUMENTS

| | | | | |
|---|---|---|---|---|
| 9,454,819 | B1 * | 9/2016 | Seetharaman | ....... G06V 10/764 |
| 10,303,178 | B1 * | 5/2019 | Gutmann | .............. G01S 13/931 |
| 11,630,197 | B2 * | 4/2023 | Unnikrishnan | ....... G01S 13/931 |
| | | | | 382/104 |
| 11,720,116 | B1 * | 8/2023 | Gutmann | .............. G01S 13/931 |
| | | | | 701/23 |
| 2010/0149020 | A1 * | 6/2010 | Arnold | .................... G01S 13/91 |
| | | | | 342/90 |
| 2015/0198711 | A1 * | 7/2015 | Zeng | ..................... G01S 13/931 |
| | | | | 342/59 |
| 2020/0249356 | A1 * | 8/2020 | Huang | .................. G01S 17/931 |
| 2021/0080571 | A1 * | 3/2021 | Von Rosenberg | .... G01S 15/931 |
| 2021/0327128 | A1 * | 10/2021 | Yu | .......................... G01S 17/931 |
| 2023/0288568 | A1 * | 9/2023 | Heo | ........................ G01S 17/58 |
| 2024/0190462 | A1 * | 6/2024 | Schwindt | ............ B60W 60/001 |
| 2024/0208531 | A1 * | 6/2024 | Schier | ................. B60W 60/001 |

* cited by examiner

*Primary Examiner* — Bernarr E Gregory
(74) *Attorney, Agent, or Firm* — Maginot, Moore & Beck LLP

(57) ABSTRACT

A method for detecting a static object using a radar sensor of a roadside unit includes scanning, using the radar sensor of the roadside unit, a surrounding environment to receive a radar reflection signal, and identifying a dynamic object in the surrounding environment based on the received radar reflection signal. The method further includes mapping the radar reflection signal to a preestablished grid map of the surrounding environment, and detecting, according to a change in a mapping state of the radar reflection signal in the preestablished grid map over time, the static object into which the dynamic object has changed.

13 Claims, 7 Drawing Sheets

METHOD AND APPARATUS FOR DETECTING STATIC OBJECT BY MEANS OF RADAR SENSOR OF ROADSIDE UNIT

This application claims priority under 35 U.S.C. § 119 to patent application no. CN 202210703212.0, filed on Jun. 21, 2022 in China, the disclosure of which is incorporated herein by reference in its entirety.

The disclosure relates to a method for detecting a static object by means of a radar sensor of a roadside unit, an apparatus for detecting a static object by means of a radar sensor of a roadside unit, a roadside unit, and a machine readable storage medium.

BACKGROUND

With the further development of Internet of vehicles technology, more and more roadside units have environmental awareness and information exchange capabilities. By means of various sensors arranged on roads, traffic conditions can be acquired in real time, and valuable information can be processed. In addition, the various sensors can also provide beyond-visual-range information to vehicles, thereby greatly improving traffic safety.

However, for radar sensor measurements, affected by the sensitivity of a target towards electromagnetic wave reflection and limited by spatial resolution, existing target detection algorithms based on radar sensors can typically detect only dynamic targets while ignoring radar echoes from a non-moving object relative to a road surface, and as a result static infrastructure cannot be reliably distinguished from a stationary traffic participant. Currently, during the operation of a tracking algorithm with the aid of a roadside radar sensor, it is likely that a tracked target will briefly stop at an intersection and then re-start, at which time, due to the poor capability of the radar sensor to identify a static object, the tracked target is often lost or the tracking process is forcedly interrupted.

In such a context, it is desirable to provide a target detection solution that employs a roadside radar sensor, so as to allow a static traffic object to be more reliably distinguished from the surrounding environment.

SUMMARY

The objective of the disclosure is to provide a method for detecting a static object by means of a radar sensor of a roadside unit, an apparatus for detecting a static object by means of a radar sensor of a roadside unit, a roadside unit, and a machine readable storage medium, so as to at least solve some of the problems in the prior art.

According to a first aspect of the disclosure, provided is a method for detecting a static object by means of a radar sensor of a roadside unit, the method comprising the following steps: S1: scanning, by means of a radar sensor of a roadside unit, a surrounding environment to obtain a radar reflection signal; S2: identifying a dynamic object in the surrounding environment on the basis of the received radar reflection signal; S3: mapping the radar reflection signal to a preestablished grid map of the surrounding environment; and S4: detecting, according to a change in mapping state of the radar reflection signal in the grid map over time, the static object into which the dynamic object has changed.

The disclosure comprises in particular the following technical concept: a temporal accumulation effect of the mapping state of the radar reflection signal is explored, so that persistently fixed mapping can be separated from temporarily fixed mapping, thereby making it possible to identify a stationary target that is temporarily formed. Therefore, a target of interest is effectively distinguished from environmental background by analyzing a radar reflection signal in the time dimension, while no complex classification algorithm needs to be additionally introduced, thereby significantly compensating for the poor static identification capability of a millimeter-wave radar.

Optionally, when detected by means of the radar reflection signal that the speed of the dynamic object is less than a preset value and/or the dynamic object can no longer be detected by means of the radar reflection signal, the detection process in step S4 is triggered.

Here, in particular, the following technical advantages are achieved: a trigger condition for static detection in terms of motion and visibility of a dynamic object is set, so that the amount of unnecessary calculation is reduced, and this is used as a filtering condition to filter out scenarios in which static objects are not likely to be present, thereby achieving a final detection result that is more precise and reliable.

Optionally, in the method, step S2 further comprises: performing target tracking on the dynamic object on the basis of radar reflection signals that are received in a plurality of measurement periods of the radar sensor and that are reflected by the identified dynamic object; and the method further comprises the following step: performing uncertainty analysis on a target tracking result of the dynamic object according to the detection result in step S4.

Here, in particular, the following technical advantages are achieved: a radar target that stops temporarily can be separated from a static background environment, so that a tracking process is not interrupted even if the radar target is no longer in motion. Furthermore, the reason why tracking is interrupted can also be explored according to a static object detection result, so as to more targetedly maintain a tracked-target list.

Optionally, performing uncertainty analysis on a target tracking result comprises: when the static object into which the dynamic object has changed is detected, assigning the static object an identifier that is consistent with that of the dynamic object, and continuing to track the static object; and/or when the static object into which the dynamic object has changed is not detected and the dynamic object can no longer be detected, deleting an identifier pre-assigned to the dynamic object, and stopping tracking the dynamic object, or maintaining the identifier of the dynamic object within a preset time period, continuously detecting the dynamic object, and when the dynamic object has still not been detected when the preset time period is exceeded, deleting the identifier and stopping tracking the dynamic object.

Here, in particular, the following technical advantages are achieved: identity matching errors in a radar target tracking process can be reduced. When a radar target changes to a stationary state, tracking and identity information thereof can still be maintained, so that the radar target is not mistakenly deleted from a tracking list, and identity information is not reassigned. Generally, the stability of a target tracking process is improved.

Optionally, step S4 comprises: obtaining a real-time mapping state of the radar reflection signal in the grid map; obtaining a first accumulated mapping state of the radar reflection signal in the grid map within a first sliding time window, and acquiring first background noise of the grid map on the basis of the first accumulated mapping state; filtering the real-time mapping state by means of the first background noise of the grid map; and for a determined region of the grid map, checking whether an association mapping with the dynamic object is present in the filtered real-time mapping state, wherein when the association mapping is present, it is determined that the static object into which the dynamic object has changed is detected.

Here, in particular, the following technical advantages are achieved: it has been recognized that in terms of temporal stability of radar mapping, there is a clear difference between a static object temporarily formed due to a change in moving state and a static environmental background; therefore, the static object can be effectively distinguished from the static environmental background by means of a filtering operation. In addition, positions of static environmental backgrounds formed by static infrastructures (e.g., buildings and trees) are mostly fixed, so that expansion of data of a certain time to an interval can advantageously take the temporal accumulation effect of radar mapping into consideration, thereby more accurately extracting background noise.

Optionally, in the method, filtering the real-time mapping state by means of the first background noise of the grid map comprises: for the determined region of the grid map, comparing the real-time mapping state with the first background noise, the determined region being an occupied region of the dynamic object in the grid map when the dynamic object is last detected by means of the radar reflection signal.

Here, in particular, the following technical advantages are achieved: a region subjected to filtering is limited to the region occupied by the dynamic object, so that the amount of data to be processed in a filtering algorithm can be reduced and a comparison process can be performed more targetedly, thereby achieving a more reliable detection result.

Optionally, checking whether an association mapping is present comprises: for the determined region, checking whether the difference between the real-time mapping state and the first background noise is greater than a threshold, wherein when determined that the difference is continuously greater than the threshold within a time period, it is determined that the association mapping is present.

Here, in particular, the following technical advantages are achieved: when a detection occasion and a detection scenario are not strictly restricted, a difference result generated by a single frame is sometimes insufficient to describe the stationary behavior of an object, and thus the transition from a dynamic object to a static object can be more reliably derived by considering the differences of consecutive frames.

Optionally, during acquisition of the first background noise, if a new dynamic object is identified in the surrounding environment, forced correction is performed on the first background noise, wherein the forced correction comprises: altering first background noise of an initially occupied region of the new moving object in the grid map when the new dynamic object is identified for the first time to a preset value.

Here, in particular, the following technical advantages are achieved: a plurality of time frames contained within a time window generally do not have a priority relationship therebetween, and therefore the first background noise reflects, to a certain degree, the average mapping state of the grid map over a period of time. Such a forced correction method can cause the mapping of a specific time frame to reflect a higher value when background data is formed, thereby more rapidly compensating for background perturbation caused by a static object suddenly being in motion or periodic maintenance and updates of static infrastructure.

Optionally, step S4 further comprises: obtaining a second accumulated mapping state of the radar reflection signal in the grid map within a second sliding time window, and acquiring second background noise of the grid map on the basis of the second accumulated mapping state, the second sliding time window being larger than the first sliding time window in terms of time span; for the determined region of the grid map, performing similarity analysis on the second background noise and the first background noise of the grid map; and performing a reliability test on the presence result of the association mapping according to the similarity analysis result, wherein when the similarity between the first background noise and the second background noise satisfies a preset condition, it is determined that the presence result of the association mapping is reliable.

Here, in particular, the following technical advantages are achieved: background noise extracted from a mapping state is not a constant, but rather may change due to an object stopping or moving again. By comparing short-term background noise and long-term background noise, the stability of background noise data can be maintained, thereby effectively removing false positive or false negative errors that affect the reliability of a detection result.

Optionally, in the method, the first background noise is acquired in the following manner: obtaining, within the first sliding time window, a statistical result of the number, density, and/or intensity of radar reflection points of each grid in the grid map when the grid is not occupied by the dynamic object or other dynamic objects, and aggregating the statistical results of all of the grids within the first sliding time window to form the first background noise of the grid map; and/or the second background noise is acquired in the following manner: obtaining, within the second sliding time window, a statistical result of the number, density, and/or intensity of radar reflection points of each grid in the grid map when the grid is not occupied by the dynamic object or other dynamic objects, and aggregating the statistical results of all of the grids within the second sliding time window to form the second background noise of the grid map; and/or dividing the second sliding time window into a plurality of sub-time windows, obtaining, within each sub-time window, a statistical result of the number, density, and/or intensity of radar reflection points of each grid in the grid map, selecting, for each grid, a statistical result within a sub-time window corresponding to the smallest number, density, and/or intensity of radar reflection points as a final statistical result of each grid, and aggregating the final statistical results of all of the grids within the second sliding time window to form the second background noise of the grid map.

Here, in particular, the following technical advantages are achieved: depending on the time span of the first sliding time window and the traffic density in a current scenario, it is advantageous to consider the mapping at a higher weight when the grid map is not occupied during calculation of the first background noise, thereby reducing the interference of a stagnant traffic flow on the first background noise. Further, considering that a short-term background and a long-term background are used for different purposes when analysis is performed, it is advantageous to respectively use different calculation methods for the first and second background noises. The first background noise is intended to reflect a real-time environmental background, but is affected by traffic density and a change in motion of a dynamic object, and thus a real background can be better extracted by considering only the mapping state when not occupied by the dynamic object. The second background noise is intended to reflect persistently fixed characteristics in the environment, which can be determined very well by means of the lowest level of the mapping state.

Optionally, the first sliding time window and the second sliding time window satisfy at least one among the following conditions: the second sliding time window is different from the first sliding time window in terms of real-timeliness; the first sliding time window and the second sliding time window at least partially overlap temporally; the time spans of the first sliding time window and/or the second sliding time window are set as fixed or variable; the time span of the first sliding time window is the same as the time spans of the sub-time windows of the second sliding time window; and/or the time span of the second sliding time window is one week, and the time span of the first sliding time window is one hour.

Here, in particular, the following technical advantages are achieved: the characteristics of the first and second sliding time windows can be flexibly adjusted according to different factors, such as traffic flow rate, a monitoring time period, weather conditions, etc., of the scenario in which the roadside unit is located, so as to meet diversified target detection requirements.

Optionally, step S4 comprises: for the occupied region of the dynamic object in the grid map when the dynamic object is last detected by means of the radar reflection signal, constructing two spatial Gaussian distributions on the basis of the mapping state of the radar reflection signal in the occupied region in different time spans, comparing the two spatial Gaussian distributions with each other in terms of an expected value and variance, and detecting, according to the comparison result, the static object into which the dynamic object has changed.

Here, in particular, the following technical advantages are achieved: when a large number of mapping state samples are accumulated over time, it is advantageous to use a statistical analysis method of the Gaussian distribution because the expectation and variance of the Gaussian distribution can be more visually analyzed and processed as compared with data filtering of specific parameters (number/intensity) of radar signals, and the comparison is also easily performed.

Optionally, in step S4, when the static object into which the dynamic object has changed is not detected, at least one among the following measures is performed: annotating a mapping state of a determined grid in the grid map as undetermined, not annotating the mapping state, and annotating the mapping state with low confidence; and correcting background noise of the grid map acquired on the basis of the mapping state, and providing the corrected background noise for detection in step S4.

Here, in particular, the following technical advantages are achieved: in some scenarios, if no static object is detected, then it is indicated that the mapping state or background noise in the grid map is wrong, and the mapping state or background noise is therefore not directly used as a determination basis of the next detection, thereby improving the reliability of object and target tracking.

According to a second aspect of the disclosure, provided is an apparatus for detecting a static object by means of a radar sensor of a roadside unit, the apparatus being used to perform the method according to the first aspect of the disclosure, and the apparatus comprising: an obtainment module, configured to scan, by means of the radar sensor of the roadside unit, a surrounding environment to obtain a radar reflection signal; an identification module, configured to identify a dynamic object in the surrounding environment on the basis of the received radar reflection signal; a mapping module, configured to map the radar reflection signal to a preestablished grid map of the surrounding environment; and a detection module, configured to detect, according to a change in mapping state of the radar reflection signal in the grid map over time, the static object into which the dynamic object has changed.

According to a third aspect of the disclosure, provided is a roadside unit, the roadside unit comprising: a radar sensor, configured to scan a surrounding environment and to receive a radar reflection signal from the surrounding environment; and the apparatus according to the second aspect of the disclosure.

According to a fourth aspect of the disclosure, provided is a machine readable storage medium, the machine readable storage medium storing a computer program, the computer program being used to perform the method according to the first aspect of the disclosure when run on a computer.

BRIEF DESCRIPTION OF THE DRAWINGS

The disclosure will be described below in further detail with reference to the accompanying drawings, so that the principles, features, and advantages of the disclosure can be better understood. The accompanying drawings include.

DETAILED DESCRIPTION

To enable the technical problems to be solved, the technical solutions, and the beneficial technical effects of the disclosure to be clearer, the disclosure will be described in further detail below with reference to the accompanying drawings and a plurality of exemplary embodiments. It should be understood that the specific embodiments described here are only used to explain the disclosure, and are not used to define the scope of protection of the disclosure.

Figure 1:
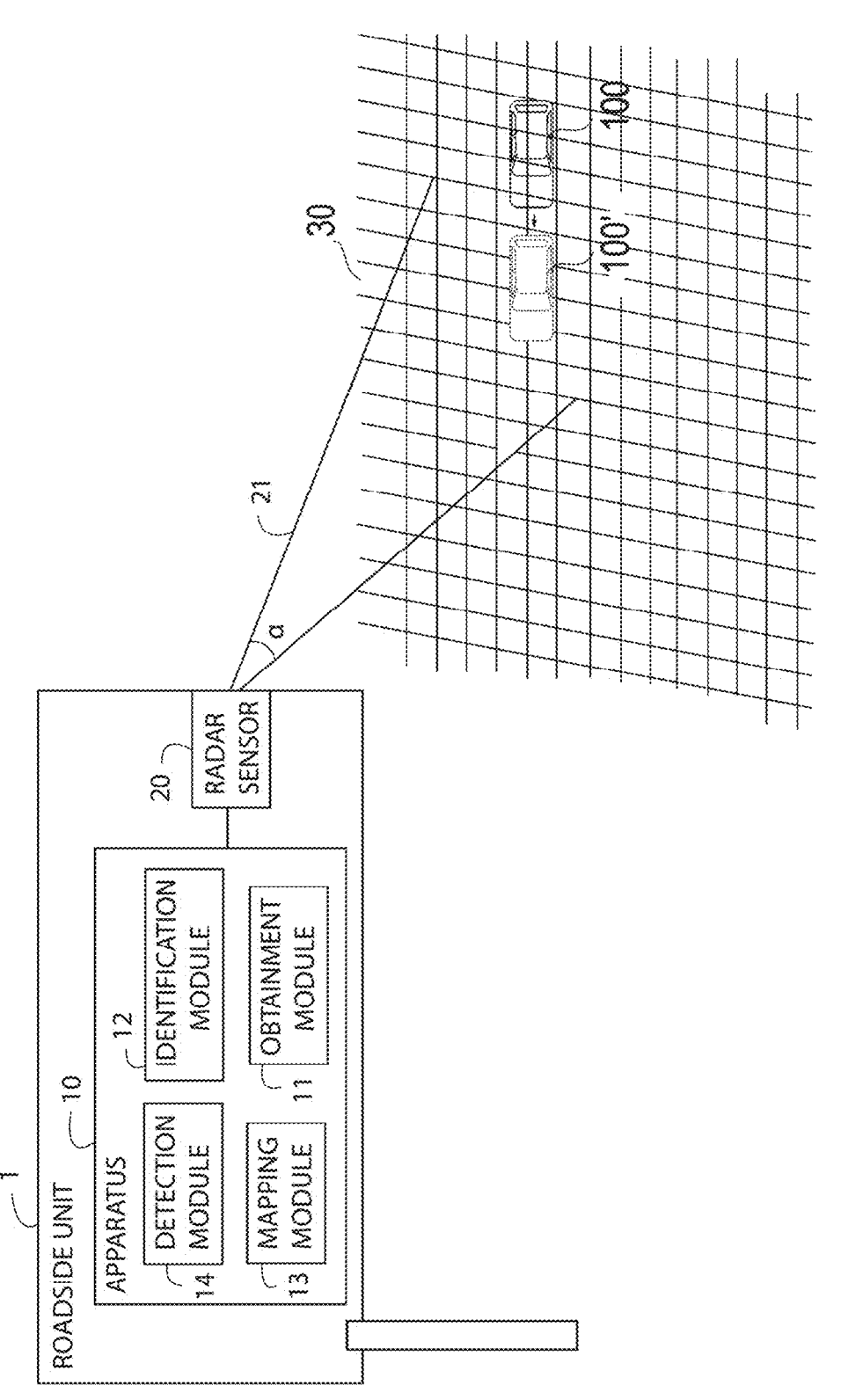
FIG. 1 shows a schematic diagram of a roadside unit according to an exemplary embodiment of the disclosure, the roadside unit including an apparatus for detecting a static object by means of a radar sensor of the roadside unit.

FIG. 1 shows a schematic diagram of a roadside unit according to an exemplary embodiment of the disclosure, the roadside unit including an apparatus for detecting a static object by means of a radar sensor of the roadside unit.

The roadside unit 1 may, for example, be a road light arranged on a roadside, a traffic sign, a portal frame on a freeway, a traffic light, or another common monitoring roadside device. As shown in FIG. 1, the roadside unit 1 includes a radar sensor 20 (e.g., provided in the roadside unit 1 or integrated with the roadside unit 1). The radar sensor 20 is, for example, a millimeter-wave radar, and has a field of view 21 covering at least a portion of a surrounding environment 30 of the roadside unit 1. It should be noted that angle range a of the field of view 21 shown in FIG. 1 is merely illustrative, and in an actual application scenario, the field of view 21 of the radar sensor 20 may be greater than or less than the shown angle range a. Further, the roadside unit 1 may also include a plurality of radar sensors having different fields of view, ranges, and scan rates, and may even include a plurality of radar sensors having at least partially overlapping fields of view so that the plurality of radar sensors collectively scan at least a portion of the surrounding environment 30. In this example, the radar sensor 20 transmits electromagnetic waves to the surrounding environment 30 by means of scanning, receives echoes reflected by a target within a radar detection range, and then sends the echoes to the apparatus 10 according to the disclosure, so that corresponding analysis and processing are performed.

In the apparatus 10, for example, an obtainment module 11 controls the frequency and time of a scanning operation of the radar sensor 20 and receives a corresponding radar reflection signal from the radar sensor 20 at determined time intervals. At the obtainment module 11, for example, simple processing may be performed on received original radar data and a radar parameter may be estimated. Then, the obtainment module 11 outputs the estimated radar parameter together with the original radar data to an identification module 12, a mapping module 13, and a detection module 14.

In the identification module 12, a dynamic object 100 in the surrounding environment 30 is identified on the basis of the received radar reflection signal. In addition, in the identification module 12, for example, a tracking unit is further provided, in which radar reflection signals received in a plurality of measurement periods are associated with the identified dynamic object 100. Then, a bounding box enveloping the dynamic object 100 is determined according to a built-in algorithm, and an identifier (ID) corresponding to each dynamic object 100 is generated, thereby implementing target tracking of all dynamic objects 100 entering the radar detection range. Additionally, at the identification module 12, identifiers of all tracked dynamic objects 100 may also be stored in the form of a list and updated periodically according to a detection result. This involves, for example, the deletion and addition of identifiers.

In the mapping module 13, for example, a grid map of the surrounding environment 30 has been preestablished or stored. The grid map divides the entire surrounding environment 30 into several equally sized grids. Over time, the mapping module 13 continually converts received radar reflection signal into a global coordinate system and projects the same into the grid map. In the example shown in FIG. 1, the described grid map may be two-dimensional and cover the surrounding environment 30 in a bird's eye view. However, it is also conceivable that the grid map is expanded to a three-dimensional space, and thus the mapping module 13 is further used to map three-dimensional radar point cloud signals into a three-dimensional spatial grid.

In the detection module 14, the static object 100' into which the dynamic object 100 has changed is detected according to a change in mapping state of the radar reflection signal in the grid map over time. The detection module 14 may, for example, also provide a detection result as feedback information to the tracking unit of the identification module 12 so that uncertainty analysis can be performed on a target tracking result according to the detection result of the static object 100' and in the tracking unit, thereby improving the stability of a target tracking process.

Figure 2:
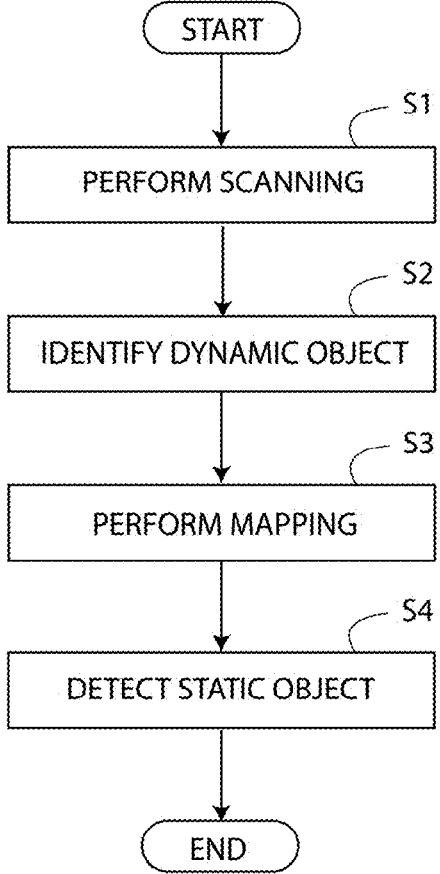
FIG. 2 shows a flowchart of a method for detecting a static object by means of a radar sensor of a roadside unit according to an exemplary embodiment of the disclosure.

FIG. 2 shows a flowchart of a method for detecting a static object by means of a radar sensor of a roadside unit according to an exemplary embodiment of the disclosure.

The method exemplarily includes steps S1 to S4, and for example, may be implemented when the apparatus 10 shown in FIG. 1 is used.

In step S1, scanning, by means of a radar sensor of a roadside unit, a surrounding environment to obtain a radar reflection signal.

As an illustration, for example, a transmit antenna of the radar sensor is controlled to transmit electromagnetic signals at a determined frequency and/or angle, and the transmitted electromagnetic signals are at least partially reflected or scattered by objects in the surrounding environment. A portion of reflected radar echo signals may be received by a receiving antenna of the radar sensor as received signals. Here, for example, point cloud data may be generated on the basis of the received radar reflection signal, and radar parameter information such as a radar reflection point, the position of the radar reflection point, intensity of the radar reflection signal, a reflection angle, etc., may be extracted accordingly.

In step S2, identifying a dynamic object in the surrounding environment on the basis of the received radar reflection signal.

As an example, in this step, a combination operation (which is also referred to as clustering) is performed on radar reflection signals on the basis of the positioned location and spatial proximity of each radar reflection signal. Then, the radar reflection signals are identified as dynamic objects (radar targets), and the location and speed information about the dynamic object are acquired.

As another example, in this step, target tracking may also be performed on the identified dynamic object on the basis of radar reflection signals received in a plurality of measurement periods of the radar sensor and reflected by the identified dynamic object. With regards to the foregoing, for example, a radar trajectory having a location and a speed and associated with the dynamic object may be provided to the tracking unit. The tracking unit maintains a historical radar trajectory of the dynamic object and predicts a future trajectory. In addition, the tracked object may also be assigned a bounding box and an identifier by means of, for example, a Kalman filter. In the sense of the disclosure, the dynamic objects include, for example, vehicles, pedestrians, animals, etc., in motion.

In step S3, mapping the radar reflection signal to a preestablished grid map of the surrounding environment.

As an example, a mapping process may be completed in the following manner: assigning one or more grids in the grid map to the received radar reflection signal according to a positioned location of a radar reflection point and annotating, in each grid of the grid map, information such as the number of radar reflection points, intensity of the radar reflection signal, density of radar reflection points, etc. Further, the occupancy status of a relevant grid in the grid map may also be annotated accordingly. For example, a plurality of grids associated with the bounding box are annotated as occupied by the dynamic object, and the remaining grids are annotated as not occupied by the dynamic object.

In step S4, detecting, according to a change in mapping state of the radar reflection signal in the grid map over time, the static object into which the dynamic object has changed.

A "static object" in the sense of the disclosure is not simply understood as an object in a stationary state, but describes especially stationary objects that are "temporarily formed" in a detection range of the radar sensor due to a change in a moving state of dynamic objects, such as vehicles, pedestrians, etc., that stop suddenly. It should be noted that the "dynamic object" and the "static object" both mentioned in this step refer to the same radar target in the surrounding environment of the radar sensor. When in the moving state, the radar target is described as a dynamic object, and when in a stopped state, the radar target is described as a static object. To be distinguished from the described temporarily formed static objects, persistently static objects such as buildings, trees, lanes, curbs, sidewalks, etc., are described herein as static background environments or static environmental objects.

Here, the detection operation in step S4 may, for example, be triggered when a radar sensor based detection result meets a predefined condition. For example, if it has been verified during target tracking that the speed of the dynamic object is close to zero or less than a preset value, or if the tracked dynamic object has disappeared from the surrounding environment of the roadside unit, the detection operation of the static object is triggered.

Figure 3:
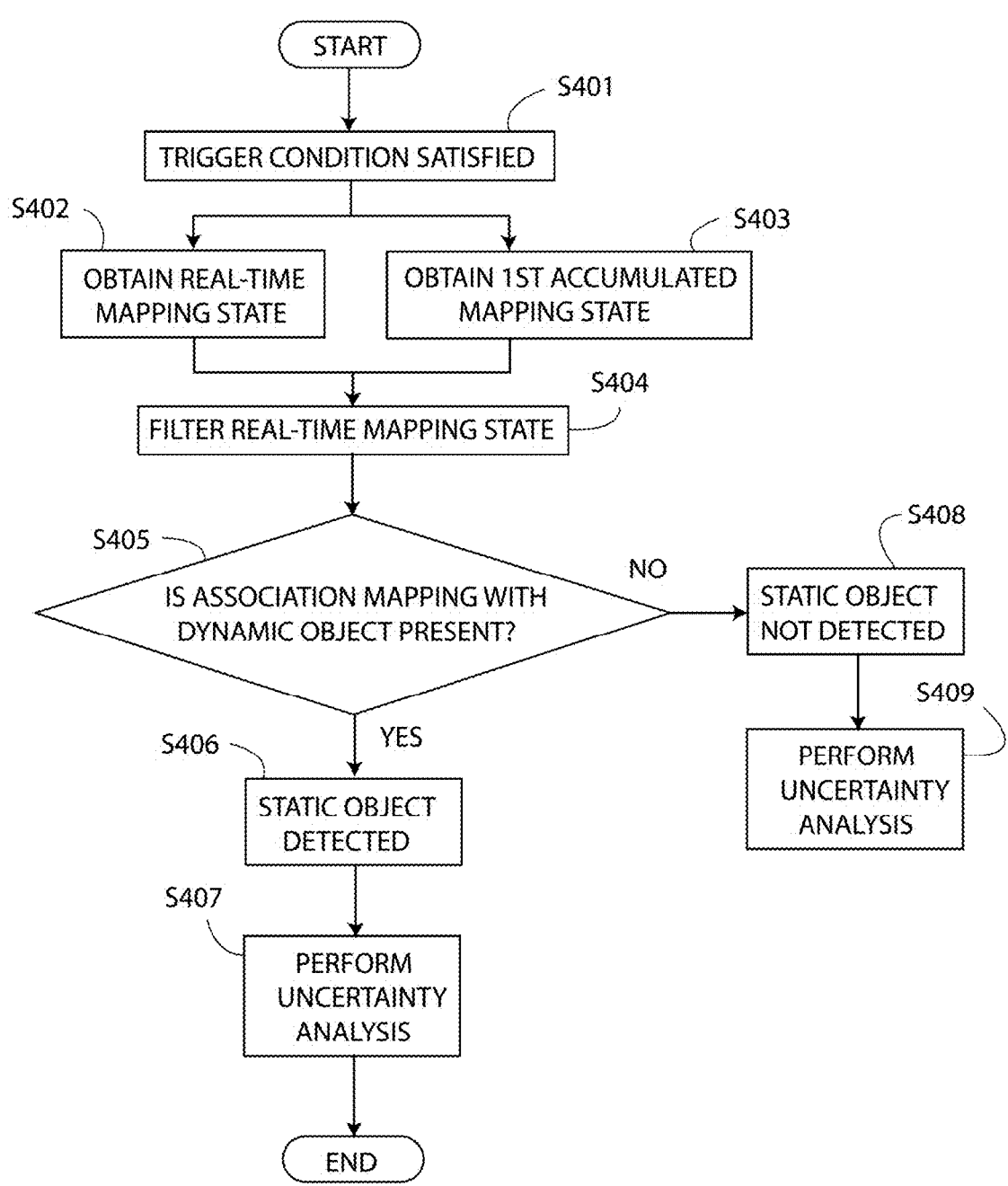
FIG. 3 shows a flowchart of a method step of the method shown in FIG. 2.

FIG. 3 shows a flowchart of a method step of the method shown in FIG. 2. In this exemplary embodiment, method step S4 in FIG. 2 includes, for example, steps S401 to S409.

In step S401, it has been determined that a corresponding trigger condition is satisfied in terms of, for example, the speed of a detected radar target. As an example, it has been detected, by means of a radar reflection signal, that the speed of a dynamic object is close to zero. Alternatively, for example, it has been found that the dynamic object can no longer be detected by means of a radar reflection signal. In an actual application, it is detected by means of the radar reflection signal that the speed of the dynamic object is close to zero or the dynamic object can no longer be detected due to the following possible reasons: the dynamic object changes from the moving state to a stationary state, the dynamic object is occluded by an obstacle, and the dynamic object leaves the detection range of the radar sensor.

In step S402, obtaining a real-time mapping state of the radar reflection signal in the grid map. Here, the real-time mapping state is obtained, for example, in the following manner: starting from a time when the trigger condition is satisfied, and for each time or each scan period, respectively obtaining the number of radar reflection points, the density of the radar reflection points, and/or the intensity of radar reflection signals in each grid of the grid map.

In step S403, obtaining a first accumulated mapping state of the radar reflection signal in the grid map within a first sliding time window, and acquiring first background noise of the grid map on the basis of the first accumulated mapping state.

Here, the first sliding time window is understood as a time sequence having a certain length. However, the position of the time sequence is not fixed in the time dimension, and the time sequence can, for example, slide dynamically along a time axis. Over time, for each slide of one time unit, data observed in the time sequence changes, thereby ensuring real-timeliness of obtained background data. Here, the time span of the first sliding time window may be fixed or variable, and the time span thereof may be selected differently in particular depending on a specific application scenario (e.g., a time period within a day, a season, traffic flow rate, weather conditions, etc.).

As an example, the first background noise is obtained in the following manner: obtaining, within the first sliding time window, a statistical result of the number, density, and/or intensity of radar reflection points of each grid in the grid map when the grid is not occupied by any dynamic object, and aggregating the statistical results of all of the grids within the first sliding time window to form the first background noise of the grid map. For example, the statistical results in all of the grids may be averaged within the first sliding time window, and an obtained average mapping state is used as the first background noise.

It should be noted that although it is shown in FIG. 3 that step S403 is performed in parallel with step S402, it is equally possible that step S403 is performed before or after step S402.

In step S404, filtering the real-time mapping state by means of the first background noise of the grid map. This includes, for example: for the occupied region of the dynamic object in the grid map when the dynamic object is last detected by means of the radar reflection signal, comparing the real-time mapping state with the first background noise. That is, the overall first background noise of the grid map is not compared with the overall real-time mapping state. Instead, only the occupied region corresponding to the dynamic object when the dynamic object is last observed before the speed of the dynamic object decreases to zero is extracted from the grid map, and then the local first background noise is compared with the local real-time mapping state for only the occupied region.

In addition to the filtering manner described herein, it is also conceivable that spatio-temporal Gaussian distributions are respectively constructed for the first background noise and the real-time mapping state, and then the two Gaussian distributions are compared with each other in terms of expectation and variance. In addition, it is also conceivable that the first background noise and the real-time mapping state are visualized by means of a machine learning model, and the filtered real-time mapping state is extracted by means of an image filtering algorithm.

Then, in step S405, for the determined region of the grid map, checking whether an association mapping with the dynamic object is present in the filtered real-time mapping state. Here, checking whether an association mapping is present includes, for example: for the occupied region of the dynamic object, checking whether the difference between the real-time mapping state and the first background noise is greater than a threshold. To obtain a more reliable determination result, it may also be checked whether the difference is continuously greater than the threshold in a plurality of consecutive frames starting from the time when it is found that the speed of the dynamic object is close to zero, or whether the number of times the difference is greater than the threshold in the plurality of consecutive frames satisfies a preset condition. The "plurality of consecutive frames" mentioned here include, for example, a plurality of consecutive times, a plurality of consecutive time intervals, or a plurality of consecutive scan periods, and the specific number thereof and value of the threshold for performing comparison may be set empirically, or for example may be selected differently according to a particular application scenario.

If it is determined in step S405 that the association mapping is present, that is, if for the determined region of the grid map it is found that the difference between the first background noise and the real-time mapping state is large and lasts a plurality of consecutive frames, it may be determined in step S406 that the static object into which the dynamic object has changed is detected. Such a determination is based in particular on the following understanding: if a vehicle in motion suddenly decelerates to zero, this can result in a significant increase in the number, density, and/or intensity of radar reflection points in a parking area of the vehicle. The increase is caused by the "dynamic object" temporarily entering the surrounding environment of the radar sensor and is thus described herein as mapping associated with the dynamic object.

In step S407, for example, uncertainty analysis may also be performed on a target tracking result according to a detection result in step S406, and a list including identity information of tracked objects may be updated accordingly. It has been verified that the dynamic object does not disappear from the range of observation, but changes into a static object, so that the identifier thereof should not be deleted from the list. Instead, the corresponding identifier is still maintained in the list, and tracking is still performed on the static object.

If it is determined in step S405 that the association mapping defined above is not present, that is, if for the determined region of the grid map, it is found that the difference between the first background noise and the real-time mapping is present only in a first frame (the time when the detection operation is triggered), and the difference can no longer be observed within a period of time thereafter, then it is determined in step S408 that the static object into which the dynamic object has changed is not detected. This may occur, for example, in the following situation: a target vehicle in motion is temporarily occluded by other vehicles or infrastructure, so that a radar reflection signal associated with the target vehicle cannot be received. In this situation, the target vehicle does not stop in an occupied region where the target vehicle is last observed before disappearing, but moves rapidly away from the occupied region, so that for the occupied region, the increase in the number or density of radar reflection points caused by the target vehicle is only "momentarily" observed, and the difference from the static environment is no longer present after the target vehicle leaves.

Then, uncertainty analysis may be performed on a target tracking result in step S409 by using the described detection result in step S408. Specifically, the static object into which the dynamic object has changed is not detected in step S408, and the dynamic object can no longer be detected, so that it can be determined that the previously tracked vehicle does not disappear from the field of view of the radar due to a sudden stop, and in this case, the tracking result can be optimized or compensated for in the following manner: deleting an identifier pre-assigned to the dynamic object, and stopping tracking the dynamic object; maintaining the identifier of the dynamic object within a preset time period, detecting the dynamic object continuously, and when the dynamic object has still not been detected when the preset time period is exceeded, deleting the identifier, and stopping tracking the dynamic object; annotating a mapping state of a determined grid in the grid map as undetermined, not annotating the mapping state, and annotating the mapping state with low confidence; and correcting first background noise in the grid map acquired on the basis of the mapping state, and providing the corrected first background noise for subsequent detection of a static object.

Figure 4:
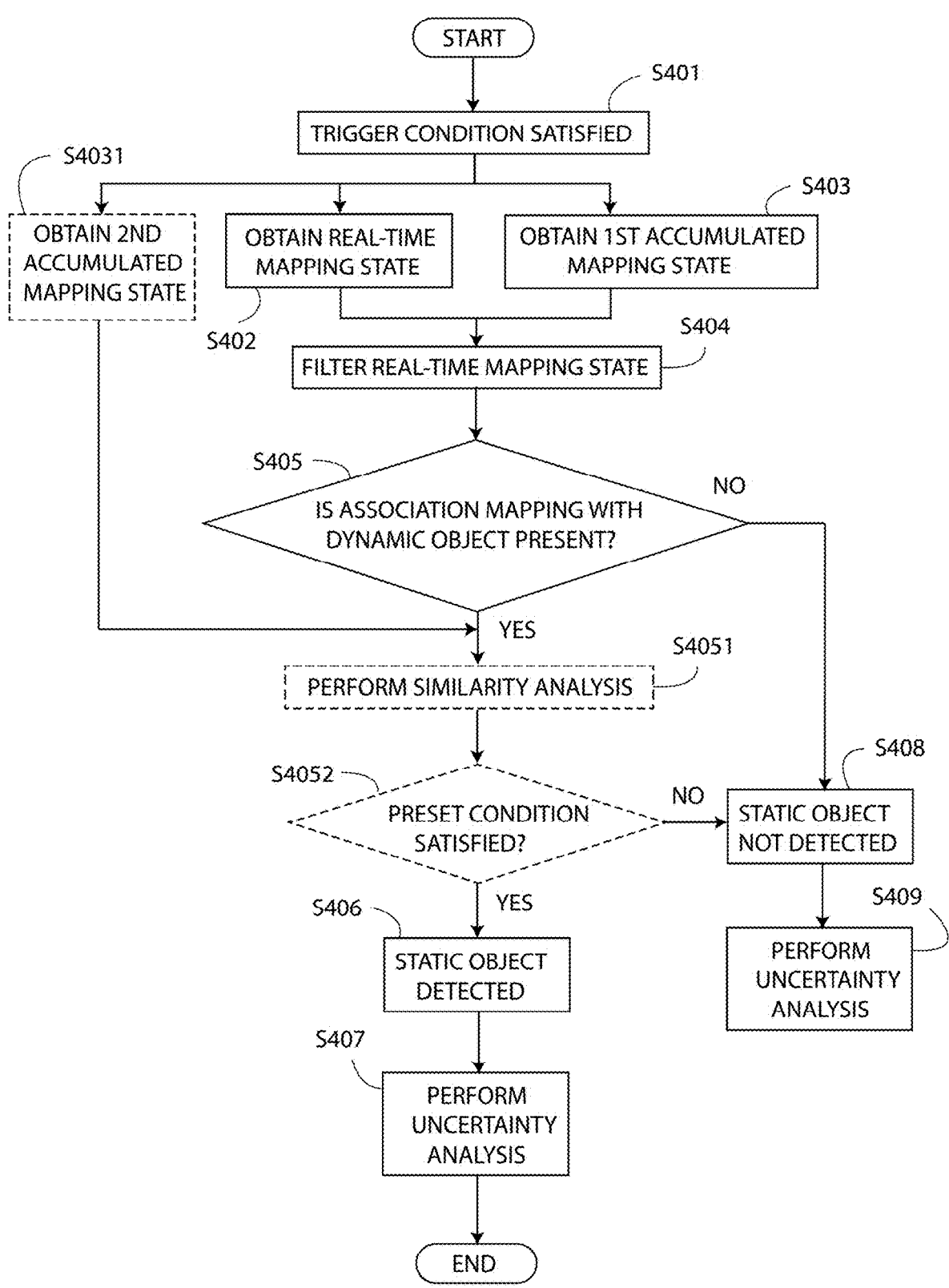
FIG. 4 shows a flowchart of a method step of the method shown in FIG. 2.

FIG. 4 shows a flowchart of a method step of the method shown in FIG. 2. In this exemplary embodiment, method step S4 in FIG. 2 additionally includes, in addition to steps S401 to S409, steps S4031, S4051, and S4052.

For steps S401 to S409, the method in FIG. 4 is performed similarly to the method in FIG. 3. Only the difference between the method shown in FIG. 4 and the method shown in FIG. 3 will be described below: as shown in FIG. 4, in addition to that the real-time mapping state and the first background noise are obtained, additional step S4031 includes: obtaining, within a second sliding time window, a second accumulated mapping state of the radar reflection signal in the grid map, and acquiring second background noise of the grid map on the basis of the second accumulated mapping state. Here, the second sliding time window is, for example, greater than the first sliding time window in terms of time span.

In step S4031, the second background noise is acquired, for example, in the following manner: obtaining, within the second sliding time window, a statistical result of the number, density, and/or intensity of radar reflection points of each grid in the grid map when the grid is not occupied by any dynamic object, and aggregating the statistical results of all of the grids within the second sliding time window to form the second background noise of the grid map; and/or dividing the second sliding time window into a plurality of sub-time windows, obtaining, within a sub-time window, a statistical result of the number, density, and/or intensity of radar reflection points of each grid in the grid map within each sub-time window, selecting, for each grid, a statistical result corresponding to the smallest number, density, and/or intensity of radar reflection points as a final statistical result of each grid, and aggregating the final statistical results of all of the grids within the second sliding time window to form the second background noise of the grid map.

After determination has been performed on the presence of association mapping on the basis of the first background noise and the real-time mapping state in step S405, if the association mapping is present, it is not determined, directly on the basis of such a determination result, that a static object is detected, and instead similarity analysis is further performed on the second background noise and the first background noise for the determined region of the grid map in additional step S4051.

Then, in step S4052, performing a reliability test on a presence result of the association mapping according to the similarity analysis result.

If it is found in step S4052 that the similarity between the first background noise and the second background noise satisfies a preset condition, it is determined that the presence result of the association mapping is reliable. Hence, in step S406, determining that the static object into which the dynamic object has changed is detected.

Conversely, if it is found in step S4052 that the similarity between the first background noise and the second background noise does not satisfy the preset condition, it is determined that the presence result of the association mapping is unreliable, and hence in step S408, it is determined that the static object into which the dynamic object has changed is not detected. Here, the result is unreliable for the following reason: the static background in the surrounding environment of the radar sensor has changed. Scenarios that may cause the result to be unreliable are introduced herein by means of three specific examples.

Example 1

A vehicle that stops at a roadside is present within the detection range of a radar sensor, and the vehicle is in a stationary state across the time span of a first sliding time window. When an operation of detecting a static object is triggered, the vehicle has not moved away, and therefore acts as first background noise. It is also detected at this point that a target vehicle (a dynamic object) that is being tracked moves in and stops in the vicinity of the stationary vehicle. In this case, a further increase in the density, number, and/or intensity of reflection points is caused by presence of the target vehicle relative to the first background noise, but is not sufficient to distinguish the target vehicle from the first background noise.

Example 2

A vehicle that stops at a roadside is present within the detection range of a radar sensor, and the vehicle moves away later. For a first sliding time window, for example, old first background noise recorded in a first half of time includes the vehicle, and a new first background noise recorded in a second half of time does not include the vehicle. The first background noise formed within the first sliding time window reflects an average result of the two. When a target vehicle moves into a region in which a stationary vehicle has stopped, a certain difference from the first background noise is generated.

Example 3

Within a first sliding time window, a previously stationary vehicle has just moved away, and first background noise has not been promptly adapted to such a change in a static environment. At this point, if a target vehicle moves into a region from which the stationary vehicle has just moved away, then even if a real-time mapping state is filtered by using the first background noise, it is possible that no association mapping can be detected because an increase in reflection points caused by the target vehicle cannot be identified.

In the three examples described above, since the persistently stationary vehicle incurs a perturbation to the first background noise, it is extremely difficult to determine, by means of only the association mapping, whether the target vehicle becomes stationary. According to the embodiment shown in FIG. 4, even if it is found that the association mapping is present in the three scenarios described above, the detection result of the static object may not be taken into consideration because the first background noise is unreliable. It should be noted that, in addition to that the reliability test is performed in the presence of the association mapping as shown in FIG. 4, the reliability test regarding the background noise may also be performed when no association mapping is found, and a corresponding measure is taken for a test result.

In another step that is not shown, if a new dynamic object is identified in a particular region (e.g., a central region of the detection range of the radar sensor) in the surrounding environment, forced correction is performed on the first background noise. Such forced correction includes, for example: when the new dynamic object is identified for the first time, for an initially occupied region of the new moving object in the grid map, altering the first background noise to a preset value. Also, it is possible to, for the initially occupied region, change the first background noise to cause the same to be consistent with the second background noise.

Figure 5A:
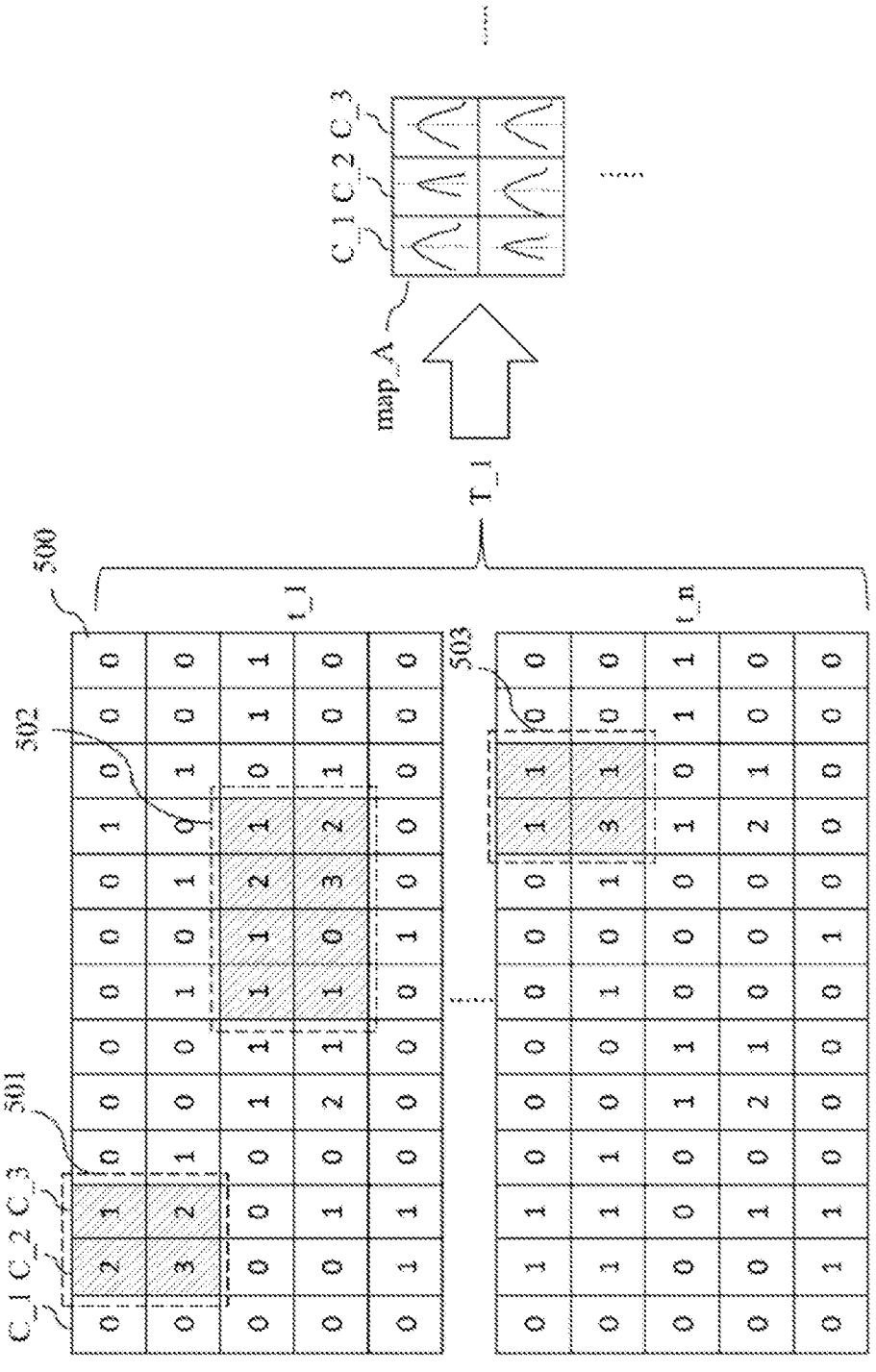
FIGS. 5A and 5B respectively show schematic diagrams of obtaining first background noise and second background noise of a radar reflection signal in a grid map.
Figure 5B:
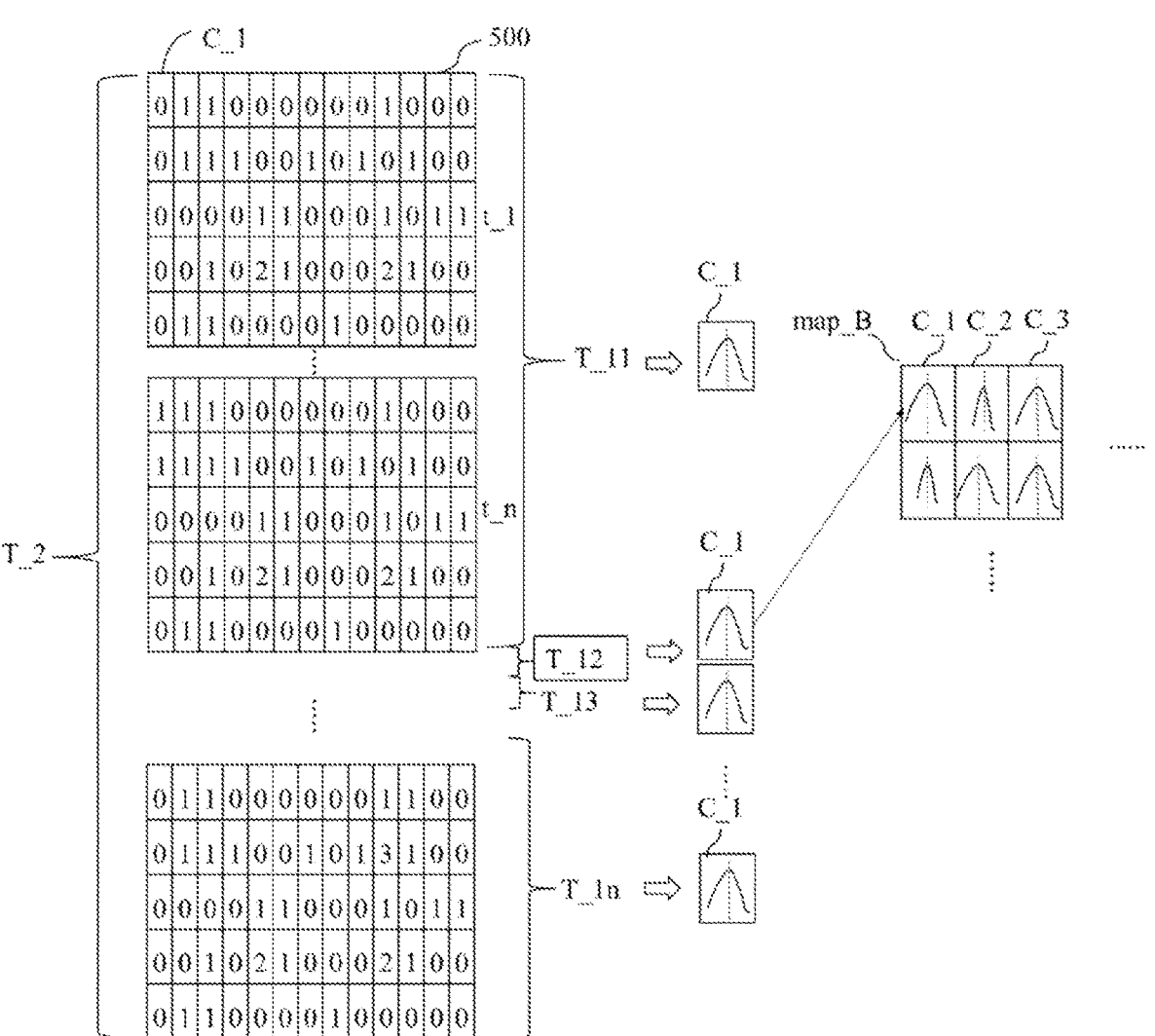

FIGS. 5A and 5B respectively show schematic diagrams of obtaining first background noise and second background noise of a radar reflection signal in a grid map.

An establishment process of the first background noise map_A is shown in FIG. 5A. First, for a plurality of scan times t_1, . . . , t_n within a first sliding time window T_1, radar reflection signals in a surrounding environment are respectively mapped into a grid map 500. At each scan time, the radar reflection signals are associated with grids in the grid map 500 according to information such as directions, angles, etc., of the radar reflection signals that are received, and the number and density of radar reflection points and the intensity of the radar reflection signals corresponding to the region are annotated in each grid. In this example, the values of numbers in each grid may reflect the above characteristics of the radar reflection signal individually or in combination. For ease of description, only three grids C_1, C_2, and C_3 in the upper left corner of the grid map 500 are annotated here, and mapping states corresponding thereto at the time t_1 are respectively 0, 2, and 1.

In addition, dynamic objects observed at different times within the first sliding time window T_1 are enclosed by dotted rectangular boxes 501, 502, and 503, and shadow regions covered by the dotted rectangular boxes 501, 502, and 503 represent occupied regions of the dynamic objects. For the generation process of the first background noise map_A, the mapping state of the shadow region is not taken into consideration. For example, for the time t_1, since two dynamic objects that are being tracked are observed in the grid map 500 at this point, only the mapping states in the grids of the remaining regions (non-shadow regions) are recorded. As another example, for the time t_n, one dynamic object that is being tracked is present in the grid map 500 at this point, so that only the mapping states of other grids excluding the shadow region are recorded at the time t_n.

A Gaussian distribution is then constructed for each grid according to radar mapping states recorded at different times. If the radar mapping state is represented by the number of radar reflection points, the abscissa axis of the Gaussian distribution represents, for example, the number of radar reflection points, and the ordinate axis represents, for example, the probability or frequency of the value of the number of radar reflection points in the grid. By aggregating the Gaussian distributions formed in all the grids, the first background noise map_A shown on the right side of FIG. 5A is ultimately obtained (the first background noise is shown for only the local region of the grid map 500 for simplicity). In addition to that statistical analysis is performed by constructing a Gaussian distribution, it is also possible to superimpose statistical results in all the grids, perform averaging within the first sliding time window T_1, and use a resulting average value as the first background noise.

An establishment process of the second background noise map_B is shown in FIG. 5B. Similar to generation of the first background noise map_A, first, for a plurality of scan times t_1, . . . , t_n within a second sliding time window T_2, radar reflection signals are respectively mapped into the grid map 500.

However, the mapping state corresponding to each time is not directly aggregated in this case, and instead, the second sliding time window T_2 is divided into a plurality of sub-time windows T_11, T_12, T13, . . . , T_1n. Here, the time span of each of the sub-time windows T_11, T_12, T13, . . . , T_1n is, for example, close to or equal to the time span of the first sliding time window T_1 in FIG. 5A. For example, if the first sliding time window T_1 slides on the time axis in the unit of "hour", the second sliding time window T_2 slides on the time axis in the unit of "week".

Then, for each of the sub-time windows T_11, T_12, T13, . . . , T_1n, statistics is respectively performed in a manner similar to the manner in which the first background noise map_A is generated, so as to acquire the average mapping state of each grid of the grid map 500 within this period of time (that is, for example, the Gaussian distribution of the number/density/intensity of radar reflection points is constructed for the sub-time window).

In FIG. 5B, a specific manner in which the second background noise map_B is generated is shown by using the grid C_1 in the upper left corner of the grid map 500 as an example. First, for the first sub-time window T_11, a Gaussian distribution is constructed on the basis of a statistical result of the number and density of radar reflection points and/or the intensity of radar reflection signals recorded in the grid C_1. This process is repeated for the second sub-time window T_12 to the n-th sub-time window T_1$n$. Thus, for the n sub-time windows within the second sliding time window T_2, n Gaussian distributions with respect to the grid C_1 are ultimately obtained. To acquire, by means of screening, the "realest static background" that is ultimately used to form the second background noise map_B, the Gaussian distribution with the least "expectation" (e.g., the Gaussian distribution corresponding to the sub-time window T_12 in this example) in the n Gaussian distributions is selected here, and is defined as the final statistical result of the grid C_1. Correspondingly, final statistical results are calculated similarly for all the remaining grids, and then the final statistical results of all the grids are aggregated to form the second background noise map_B shown on the right side of FIG. 5B.

It should be noted here that in the embodiment shown in FIG. 5B, although the statistical result in each of the sub-time windows T_11, T_12, T13, . . . , T_1$n$ is calculated for the grid C_1 in the manner in which the first background noise map_A is calculated (that is, the mapping state of the region occupied by the dynamic object at each time is not taken into consideration), it is equally possible that the mapping state of the region occupied by the dynamic object is not excluded when the statistical result of each of the sub-time windows T_11, T_12, T13, . . . , T_1$n$ is calculated, so as to simplify the calculation process. This is because the time span of the second sliding time window T_2 is longer, and perturbation caused to the mapping state when the dynamic object passes can be ignored to a certain degree. In addition, it is also possible that the time span of each of the sub-time windows T_11, T_12, T13, . . . , T_1$n$ of the second sliding time window T_2 is selected to be different from that of the first sliding time window T_1.

Figure 6:
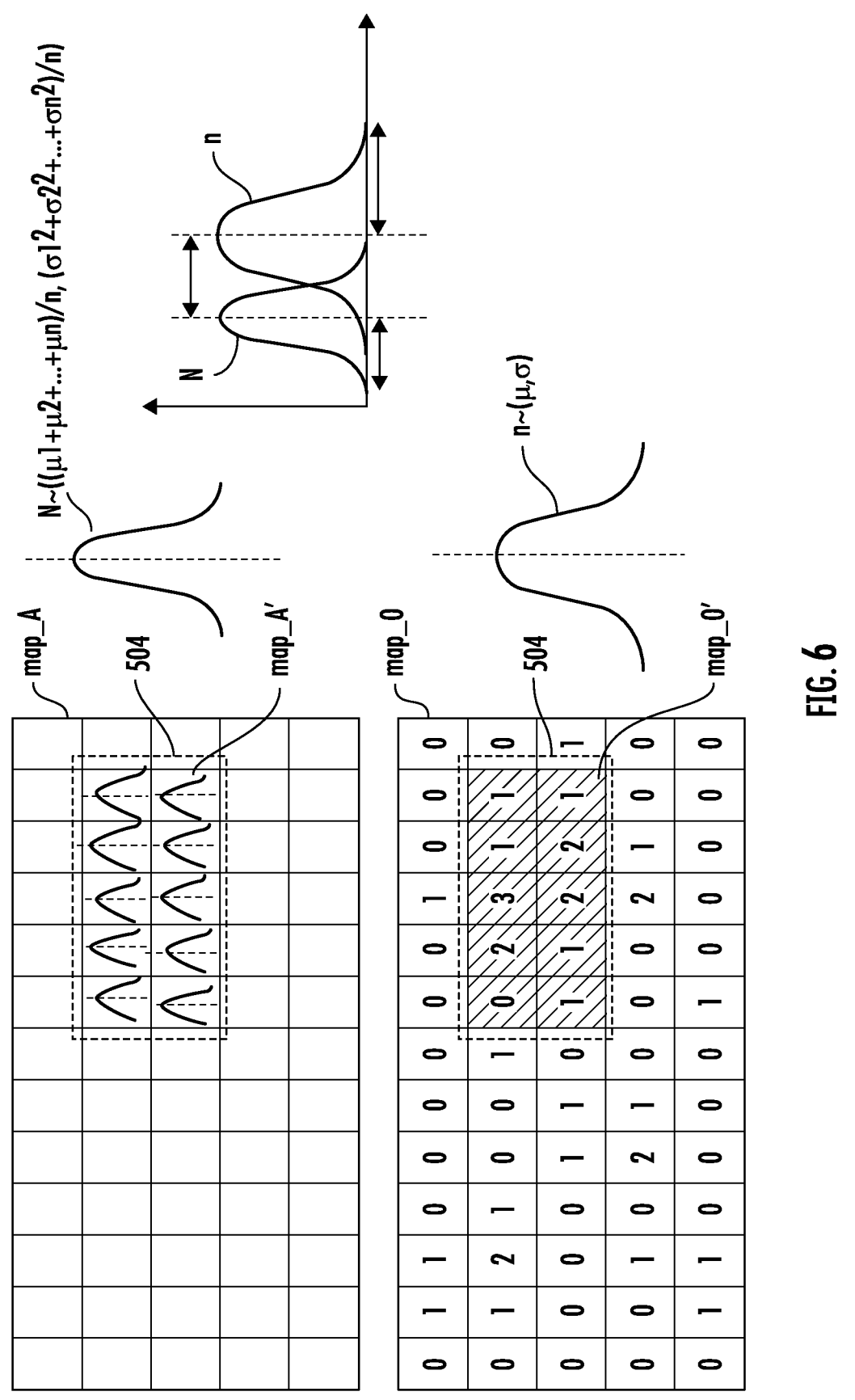
FIG. 6 shows a schematic diagram of filtering a real-time mapping state by means of the first background noise according to an exemplary embodiment of the disclosure.

A schematic diagram of a process of filtering a real-time mapping state by means of first background noise of a grid map is shown in FIG. 6.

The first background noise map_A and the real-time mapping state map_0 of the grid map 500 are respectively shown on the left side of FIG. 6. The real-time mapping state map_0 may be understood as the mapping state in the grid map 500 at each time starting from triggering of detection of a static object. Here, a filtering process may be implemented by comparing the real-time mapping state map_0 with the first background noise map_A. In order to reduce computation overhead and improve the reliability a comparison result, for example, the first background noise map_A and the real-time mapping state map_0 of the entire grid map 500 are not compared with each other. Instead, a local first background noise map_A' and a local real-time mapping state map_0' are extracted only for an occupied region 504 of a dynamic object in the grid map when the dynamic object is last observed, and are compared with each other.

In terms of the real-time mapping state map_0, at each time starting from the last observation of the dynamic object, a real-time Gaussian distribution $n\sim(\mu,\sigma^2)$ is constructed on the basis of values of all grids in the occupied region 504, wherein p represents an expectation of the Gaussian distribution n, and $\sigma^2$ represents a variance. Then, such a real-time Gaussian distribution $n\sim(\mu,\sigma^2)$ is used as the real-time mapping state of the occupied region 504. In terms of the first background noise map_A, the average mapping state (i.e., the historical Gaussian distribution) in the first sliding time window has been recorded in each grid of the occupied region 504, so that in order to facilitate comparison, historical Gaussian distributions $N1\sim(\mu1,\sigma1^2)$, $N2\sim(\mu1, \sigma2^2)$, . . . , $Nn\sim(\mu n, \sigma n^2)$ of all of the grids in the occupied region 504 may be superimposed, and results of the superposition are averaged to the unit grids to obtain a total Gaussian distribution $N\sim((\mu1+\mu2+ . . . +\mu n)/n, (\sigma1^2+ \sigma2^2+ . . . +\sigma n^2)/n)$. Finally, the total Gaussian distribution $N\sim((\mu1+\mu2+ . . . +\mu n)/n, (\sigma1^2+\sigma2^2+ . . . +\sigma n^2)/n)$ is compared with the real-time Gaussian distribution $n\sim(\mu,\sigma^2)$, which, for example, is visually shown on the right side of FIG. 6. As an example, if the difference between two Gaussian distributions in terms of the expectation and/or variance is always greater than a predetermined threshold at a plurality of consecutive times starting from the time when the dynamic object is last observed, it is considered that an association mapping with the dynamic object is present.

While particular implementations of the disclosure are described in detail herein, they are provided merely for illustrative purposes and should not be construed as limiting the scope of the disclosure. Various substitutions, alterations, and modifications can be made without departing from the spirit and scope of the disclosure.

What is claimed is:

1. A method for detecting a static object using a radar sensor of a roadside unit, comprising:
scanning a surrounding environment to receive a radar reflection signal using the radar sensor of the roadside unit;
identifying a dynamic object that is moving in the surrounding environment based on the received radar reflection signal;
mapping the radar reflection signal to a preestablished grid map of the surrounding environment; and
detecting the static object, which is the dynamic object that has stopped moving, according to a change in a mapping state of the radar reflection signal in the preestablished grid map over time,
wherein detecting the static object comprises:
obtaining a real-time mapping state of the radar reflection signal in the preestablished grid map;
obtaining a first accumulated mapping state of the radar reflection signal in the preestablished grid map within a first sliding time window, and acquiring first background noise of the preestablished grid map based on the first accumulated mapping state;
filtering the real-time mapping state based on the first background noise of the preestablished grid map; and
for a determined region of the preestablished grid map, checking whether an association mapping with the dynamic object is present in the filtered real-time mapping state,
detecting the static object when the association mapping is present.

2. The method according to claim 1, wherein the detecting the static object is triggered when (i) the radar reflection signal indicates that a speed of the dynamic object is less than a preset value, and/or (ii) the dynamic object can no longer be detected by the radar reflection signal.

3. The method according to claim 1, further comprising:
receiving a plurality of the radar reflection signals in a plurality of measurement periods of the radar sensor and that are reflected by the dynamic object; and
performing uncertainty analysis on a target tracking result of the dynamic object according to the detected static object, wherein the identifying the dynamic object further comprises performing target tracking on the dynamic object based on the plurality of the radar reflection signals.

4. The method according to claim 3, wherein the performing uncertainty analysis on the target tracking result comprises:

when the static object is detected, assigning the static object an identifier that is consistent with that of the dynamic object, and continuing to track the static object; and/or when the static object is not detected and the dynamic object can no longer be detected (i) deleting an identifier pre-assigned to the dynamic object, and stopping tracking the dynamic object, or (ii) maintaining the identifier of the dynamic object within a preset time period, continuously detecting the dynamic object, and when the dynamic object has still not been detected when the preset time period is exceeded, deleting the identifier and stopping tracking the dynamic object.

5. The method according to claim 1, wherein:

the filtering the real-time mapping state based on the first background noise of the preestablished grid map comprises for the determined region of the preestablished grid map, comparing the real-time mapping state with the first background noise, the determined region of the preestablished grid map being an occupied region of the dynamic object in the preestablished grid map when the dynamic object is last detected based on the radar reflection signal; and/or the checking whether an association mapping is present comprises for the determined region of the preestablished grid map, checking whether a difference between the real-time mapping state and the first background noise is greater than a threshold, wherein when determined that the difference is continuously greater than the threshold within a time period, determining that the association mapping is present.

6. The method according to claim 1, wherein:

during acquisition of the first background noise, when a new dynamic object is identified in the surrounding environment, a forced correction is performed on the first background noise, and the forced correction comprises altering first background noise of an initially occupied region of the new dynamic object in the preestablished grid map when the new dynamic object is identified for a first time to a preset value.

7. The method according to claim 1, wherein the detecting the static object further comprises:

obtaining a second accumulated mapping state of the radar reflection signal in the preestablished grid map within a second sliding time window, and acquiring second background noise of the preestablished grid map based on the second accumulated mapping state, the second sliding time window being larger than the first sliding time window in terms of time span;

for the determined region of the preestablished grid map, performing similarity analysis on the second background noise and the first background noise of the preestablished grid map; and performing a reliability test on a presence result of the association mapping according to the similarity analysis result, when the similarity between the first background noise and the second background noise satisfies a preset condition, determining that the presence result of the association mapping is reliable.

8. The method according to claim 7, wherein:

the first background noise is acquired by (i) obtaining, within the first sliding time window, a statistical result of a number, density, and/or intensity of radar reflection points of each grid in the preestablished grid map when the preestablished grid map is not occupied by the dynamic object or other dynamic objects, and (ii) aggregating the statistical results of all of the grids within the first sliding time window to form the first background noise of the preestablished grid map; and/or the second background noise is acquired by:

(i) obtaining, within the second sliding time window, a statistical result of a number, density, and/or intensity of radar reflection points of each grid in the preestablished grid map when the preestablished grid map is not occupied by the dynamic object or other dynamic objects, and (ii) aggregating the statistical results of all of the grids within the second sliding time window to form the second background noise of the preestablished grid map; and/or (i) dividing the second sliding time window into a plurality of sub-time windows, (ii) obtaining, within each sub-time window, the statistical result of the number, density, and/or intensity of radar reflection points of each grid in the preestablished grid map, (iii) selecting, for each grid, a statistical result within a sub-time window corresponding to a smallest number, density, and/or intensity of radar reflection points as a final statistical result of each grid, and (iv) aggregating the final statistical results of all of the grids within the second sliding time window to form the second background noise of the preestablished grid map.

9. The method according to claim 8, wherein the first sliding time window and the second sliding time window satisfy at least one of:

the second sliding time window is different from the first sliding time window in terms of real-timeliness;

the first sliding time window and the second sliding time window at least partially overlap temporally;

a time span of the first sliding time window and/or a time span of the second sliding time window are set as fixed or variable;

the time span of the first sliding time window is equal to time spans of the sub-time windows of the second sliding time window; and/or the time span of the second sliding time window is one week, and the time span of the first sliding time window is one hour.

10. The method according to claim 1, wherein the detecting the static object further comprises:

when the static object is not detected, performing at least one of:

annotating a mapping state of a determined grid in the preestablished grid map as undetermined, not annotating the mapping state, and annotating the mapping state with low confidence; and correcting background noise of the grid map acquired based on the mapping state, and providing the corrected background noise for detecting the static object.

11. The method according to claim 1, wherein a non-transitory machine readable storage medium is configured to store a computer program used to perform the method when the computer program is run on a computer.

12. An apparatus for detecting a static object using a radar sensor of a roadside unit, comprising:

a processor configured to:

operate a radar sensor of the roadside unit to scan a surrounding environment to obtain a radar reflection signal;

identify a dynamic object that is moving in the surrounding environment based on the radar reflection signal;

map the radar reflection signal to a preestablished grid map of the surrounding environment;

detect the static object, which is the dynamic object that has stopped moving, according to a change in mapping state of the radar reflection signal in the grid map over time;

receive a plurality of the radar reflection signals that are reflected by the dynamic object in a plurality of measurement periods of the radar sensor; and perform uncertainty analysis on a target tracking result of the dynamic object according to the detected static object, wherein identifying the dynamic object comprises performing target tracking on the dynamic object based on the plurality of the radar reflection signals, wherein performing uncertainty analysis on the target tracking result comprises:

when the static object is detected, assigning the static object an identifier that is consistent with that of the dynamic object, and continuing to track the static object; and/or when the static object is not detected and the dynamic object can no longer be detected (i) deleting an identifier pre-assigned to the dynamic object, and stopping tracking the dynamic object, or (ii) maintaining the identifier of the dynamic object within a preset time period, continuously detecting the dynamic object, and when the dynamic object has still not been detected when the preset time period is exceeded, deleting the identifier and stopping tracking the dynamic object.

13. A roadside unit comprising:

a radar sensor configured to scan a surrounding environment and to receive a radar reflection signal from the surrounding environment; and an apparatus for detecting a static object using the radar sensor, the apparatus including a processor configured to:

identify a dynamic object that is moving in the surrounding environment based on the received radar reflection signal;

map the radar reflection signal to a preestablished grid map of the surrounding environment; and detect the static object, which is the dynamic object that has stopped moving, according to a change in mapping state of the radar reflection signal in the grid map over time, wherein when the static object is not detected, performing at least one of:

(i) annotating the mapping state of a determined grid in the preestablished grid map as undetermined, (ii) not annotating the mapping state, and (iii) annotating the mapping state with low confidence; and correcting background noise of the grid map acquired based on the mapping state, and providing the corrected background noise for detecting the static object.

\* \* \* \* \*